United States Patent [19]

Zahner et al.

[11] 4,020,306

[45] Apr. 26, 1977

[54] HIGH VOLTAGE SWITCHING DEVICE WITH CALCIUM-ALUMINUM GLASS FILLED RESIN INSULATOR SUPPORT

[76] Inventors: Hansruedi Zahner, Dreizelgenweg 22, CH-5036 Oberfelden, Switzerland; Gerd Müller, Im Dorfgraben 43, 65 Maint-Laubenheim, Germany

[22] Filed: Dec. 3, 1974

[21] Appl. No.: 529,092

[30] Foreign Application Priority Data

Dec. 7, 1973 Switzerland ..................... 17164/73

[52] U.S. Cl. ........................... 200/293; 200/144 C; 200/148 G; 260/37 EP

[51] Int. Cl.² ................... H01H 9/00; H01H 33/00; C08L 63/00

[58] Field of Search ....... 200/144 R, 144 C, 144 B, 200/151, 148 G, 293; 174/110 R, 110 E, 110 SR; 260/37 EP, 37 R; 106/41, 37

[56] References Cited

UNITED STATES PATENTS

| | | | |
|---|---|---|---|
| 3,312,558 | 4/1967 | Miller, Jr. | 106/41 X |
| 3,464,854 | 9/1969 | Bolger | 260/37 EP X |
| 3,553,410 | 1/1971 | Morua | 200/144 C X |
| 3,698,920 | 10/1972 | Pitha | 200/144 C X |
| 3,828,000 | 8/1974 | Luck et al. | 260/37 EP |

*Primary Examiner*—James R. Scott

*Attorney, Agent, or Firm*—Littlepage, Quaintance, Murphy & Dobyns

[57] ABSTRACT

An electrical device having arc-prone electrical contacts within a container and an arc-resistant dielectric halogenated gas within the container. Also within the container is a filled resin electrical insulator. The filled resin comprises a cured epoxy resin and a filler of particles of calcium-aluminum glass.

12 Claims, 1 Drawing Figure

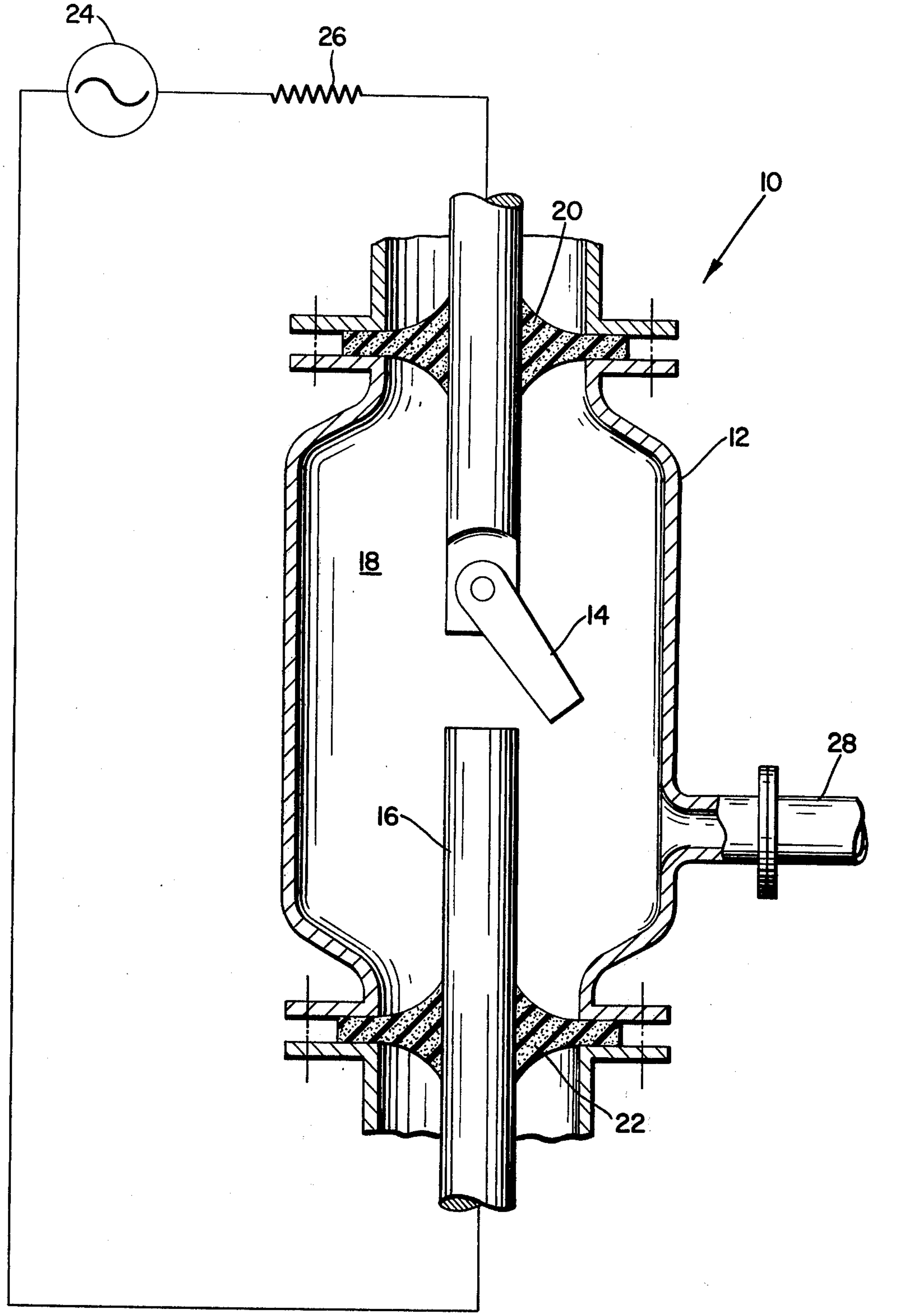
24
26
10
20
12
18
14
28
16
22

HIGH VOLTAGE SWITCHING DEVICE WITH CALCIUM-ALUMINUM GLASS FILLED RESIN INSULATOR SUPPORT

Electrical devices are known which comprise an arc-prone electrical contact, an arc-resistant dielectric halogenated gas and a filled resin electrical insulator all within a container. The halogenated gas is present in order to inhibit arcing. However, under the influence of electrical dicharges it may decompose and with the hydrogen of organic compounds form hydrogen halides. It is also well known to employ filled resins in general and epoxy resins in particular in such devices. Unfortunately, the resin does provide hydrogen for the formation of the corrosive hydrogen halide. Many suggestions have been made for reducing the reactivity of the resin with the hydrogen halide. Many types of fillers, oxides, fluorides, carbonates and sulfates and in particular alumina ($Al_2O_3$) have been suggested. Alternatively, other organic compounds may be added to the resin. See, for example, United Kingdom Pat. No. 998,866; German published documents numbered 1,113,812; 1,193,568; 1,253,786; and U.S. Pat. Nos. 2,768,264; 3,467,760; 3,838,055; 3,698,920; 3,560,685; 3,814,620; 3,557,576; 3,378,362 and 3,655,565.

Unfortunately, all of the previously suggested fillers suffer from a number of disadvantages. Most of the previously-suggested fillers do not impart a sufficient resistance to degradation. Many of the previously-suggested fillers can not be combined with the epoxy resin in an amount great enough to be effective. With many molded fillers the exposed surface is poor in filler and still subject to corrosion. Still other fillers in general and alumina in particular are difficult to expensive to produce free of contaminants. Yet other fillers impart to the filled resin an undesirably low mechanical strength.

It is, therefore, an object of the present invention to provide an electrical device substantially free of one or more of the disadvantages of prior electrical devices.

Another object is to provide an improved electrical device employing a filled resin which has a greater resistance to degradation than prior filled resins.

A further object is to provide an improved electrical device employing a filled resin capable of accepting a greater amount of filler.

A still further object of the present invention is to provide an improved electrical device wherein the filler employed in the filled resin is free of contaminants.

Yet another object is to provide an improved electrical device employing a filled resin of high mechanical strength. Additional objects and advantages of the present invention will be apparent to those skilled in the art by reference to the following detailed description and drawings wherein there is schematically shown a sectional view of an electrical device of the present invention.

The above and other objects are accomplished according to the present invention by employing as a filler in the cured epoxy resin a calcium aluminum glass. In the class of well known calcium aluminum glasses, CaO and $Al_2O_3$ are the chief components. Although the calcium aluminum glass can contain widely varying weight ratios of calcium to aluminum, generally the $Al_2O_3$ content is between 25 and 75% by weight and the CaO content between 20 and 60% by weight. Preferred ranges are 35–60% by weight $Al_2O_3$ and 20–50% by weight CaO. Outside these ranges the filled resin insulators employed in the present invention do not exhibit the optimum properties.

The glass must be free of silicon, boron and alkali compounds, particularly oxides in order to withstand any action with the decomposition products of the electronegative gases. The calcium aluminum glass of the present invention can also contain varying amounts and generally up to 30 and preferably 2 to 20 percent by weight of BaO, SrO, MgO, BeO, ZnO, $La_2O_3$, $Sb_2O_3$, $ZrO_2$, $P_2O_5$, $Fe_2O_3$, and/or $TiO_2$. These components improve the ability of the glass to resist devitrication and increase the chemical stability of the glass.

In the broadest aspects of the present invention the calcium aluminum glass can have any physical form. However, in the preferred embodiment the particles of the calcium aluminum glass are present as small spheres. The size of the spheres can vary widely depending upon the particular application but generally are between 1 and 100 microns. The spheres of the calcium aluminum glass impart a greater strength to the filled resin than do the splintery grain shapes of pure $Al_2O_3$. Moreover, the size of the glass spheres can be controlled and a mixture of sizes can be used for filler.

The calcium aluminum glass is melted at a temperature between 1450° and 1600° C. Because of its low viscosity the melt can be sprayed in a controlled manner in the temperature range of 1400° to 1500° C to form small balls of varying diameters, usually 10–100 microns. The spherical balls have, of course, greater mechanical strength than irregular grain shapes such as those of the fused corondum ($Al_2O_3$) or powdered quartz. The variety of sizes too makes it possible to fill the resin more completely and this too increases the strength of the insulating material.

The arc-resistant dielectric halogenated gas can be any of those employed in prior art devices as shown by the references previously cited. Examples of suitable arc-resistant dielectric halogenated gases include among others difluoro-dichloromethane, $SF_2$, $SOF_2$, $SOF_4$, and sulfur hexafluoride ($SF_6$) which is preferred.

In the broadest aspects of the present invention any epoxy resin can be employed such as those disclosed in the above-cited references. The cured epoxy resin is generally the reaction product of an epoxy component and a reactive component. The epoxy component is itself the reaction product of a polyphenol and an epihalohydrin such as epichlorohydrin. Examples of suitable polyphenols include among others 2,2-bis(4' hydroxyphenyl) propane or Bisphenol A; p,p' dihydroxydiphenyl dimethyl methane, bis(4-hydroxyphenyl) methane or bisphenol F, 2,2-bis(4'hydroxy--2',3',5',6' tetrachlorophenyl)propane or tetrachlorobisphenol A, 4,4-bis (4'hydroxyphenyl)pentanoic acid or diphenolic acid, 2,2,5,5-tetrakis (4'hydroxyphenyl)hexane, bis(4 hydroxyphenyl)sulfone or bisphenol S, 2,2-bis(4'hydroxyphenol) butane, 4,4'dihydroxybenzophenone, bis(4 hydroxyphenyl)ethane, 2,2-bis (4'hydroxylphenyl)pentane, 1,5 dihydroxynaphthalene, 1,1'-bis(4 hydroxy-3-methyl phenyl)cyclohexane, 1,1'-bis (3,4 dihydroxyhexahydrophenyl) cyclohexane and novolak resins containing more than two phenol moieties linked through methylene bridges which are called phenol-formaldehyde novolaks.

The coreactant can be any material that will react with the terminal epoxy groups present in the uncured epoxy resin. However, the preferred coreactants are polycarboxylic acids having two or more polycarboxylic acid or polycarboxylic acid anhydride groups. Examples of suitable coreactants include among others maleic acid, maleic anhydride, tetrahydrophthalic acid, tetrahydrophthalic anhydride, hexahydrophthalic anhydride, glutaric acid, glutaric anhydride, succinic acid, succinic anhydride, suberic acid, suberic anhydride, homophthalic acid, homophthalic anhydride and trimellelitic acid, trimelletic anhydride, and pyromellitic anhydride. The most preferred polycarboxylic acid is hexahydrophthalic anhydride.

The epoxy resin and the filler can be mixed in widely varying weight ratios but are generally mixed in a weight ratio between 4:1 and 1:20 and preferably in a ratio between 2:1 and 1:5. Generally when the mixture contains too little filler it does not have sufficient resistance to hydrogen halide whereas when it contains too little resin its mechanical properties are adversely affected.

The invention may be better understood by reference to the drawings wherein there is shown an electrical device in the form of a circuit breaker 10. The circuit breaker comprises a metallic container 12 with electrical contacts 14, 16. Within the container 12 is a space 18 filled with sulfur hexafluoride. The contact 14 is insulated from the container 12 by the insulator 20. The contact 16 is separated from the container 12 by the insulator 22. The circuit breaker 10 can be placed in series with means for passing a current through the contacts 14, 16. This means can comprise a generator 24 and a load shown generally as the resistor 26. The circuit breaker 10 is provided with means (not shown) for contacting the contact 14 with the contact 16 and also for separating the contact 14 from the contact 16. When such separation occurs arcing is inhibited although not eliminated by the sulfur hexafluoride present in the space 18. The pressure of the sulfur hexafluoride can be controlled by addition or removal of sodium hexafluoride through the conduit 28.

The insulators 20, 22 are produced by mixing the following quantities of the following ingredients:

| | Parts by Weight |
|---|---|
| 1,1'-bis(3,4 epoxyhexahydrophenyl)cyclohexane | 100 |
| hexahydrophthalic acid anhydride | 45 |
| filler | 70 |

The filler is a calcium-aluminum glass of the following composition by weight:

| | |
|---|---|
| CaO | 39.0 |
| $Al_2O_3$ | 45.0 |
| BaO | 10.0 |
| $TiO_2$ | 3.0 |
| ZnO | 3.0 |
| | 100.0 |

The particles have a spherical form and have a diameter between 1 and 100 microns. The size distribution is as follows:

| | | |
|---|---|---|
| 5% | | 100 microns |
| 10% | | 50 microns |
| 25% | | 30 microns |
| 30% | | 20 microns |
| 30% | less than | 10 microns |
| 100% | | |

Although the present invention has been described in considerable detail it will be appreciated that modifications can be made by those skilled in the art without departing from the spirit and scope thereof.

What is claimed is:

1. An electrical device comprising:

A. a container,

B. arc-prone electrical contacts within the container,

C. an arc-resistant, dielectric halogenated gas within the container,

D. a filled resin electrical insulator within the container in contact with the gas, said filled resin comprising:

1. a cured epoxy resin,
2. a filler of particles of calcium-aluminum glass wherein the glass is free of silicon, boron, and alkali metals.

2. An electrical device comprising:

A. a container,

B. arc-prone electrical contacts within the container,

C. an arc-resistant, dielectric halogenated gas within the container,

D. a filled resin electrical insulator within the container in contact with the gas, said filled resin comprising:

1. a cured epoxy resin,
2. a filler of particles of calcium-aluminum glass,
   a. wherein the glass is free of silicon, boron, and alkali metals,
   b. wherein the calcium aluminum plan contains between 25 and 75% by weight $Al_2O_3$ and between 20 and 60% by weight CaO,
   c. wherein the calcium aluminum glass contains up to 30 weight percent of an oxide selected from the group consisting of BaO, SrC, MgO, BeO, ZnO, $La_2O_3$, $Sb_2O_3$, $ZrO_2$, $P_2O_5$, $Fe_2O_3$, and $TiO_2$.

3. The electrical device of claim 2 wherein the calcium aluminum glass contains between 35 and 60% by weight $Al_2O_3$ and between 20 and 50% by weight CaO.

4. The electrical device of claim 2 wherein the particles are spherical in shape.

5. The electrical device of claim 2 wherein the the particles are of a spherical shape and have a size between 1 and 100 mircons.

6. The device of claim 2 wherein the halogenated gas is a gaseous fluorine-containing compound.

7. The device of claim 2 wherein the halogenated gas is sulfur hexafluoride.

8. An electrical device comprising:

A. a gas-tight container,

B. a plurality of arc-prone electrical contacts within the container, said contacts being provided with means for passing a current through the contacts while in contact with each other, C. an arc-resistant, dielectric halogenated gas within the container, said gas being sulfur hexafluoride, D. a filled resin electrical insulator within the container in contact with the gas, said insulator physically separating and electrically insulating the electrical contacts from the container, said resin comprising:

1. a cured epoxy resin comprising the reaction product of:
a. 1,1'-bis(3,4 epoxyhexahydrophenyl)cyclohexane,
b. hexahydrophthalic acid anhydride,
2. a filler of particles of calcium-aluminum glass,
a. wherein the glass is free of $SiO_2$, $B_2O_3$, and alkali oxides,
b. wherein contains between 35 and 60% by weight $Al_2O_3$ and between 20 and 50% by weight CaO.
c. wherein the calcium aluminum glass contains 2 to 20 weight percent of an oxide selected from the group consisting of BaO, SrO, MgO, BeO, ZnO, $La_2O_3$, $Sb_2O_3$, $ZrO_2$, $P_2O_5$, $Fe_2O_3$, and $TiO_2$,
d. wherein the particles are spherical in form and have a variety of sizes between 1 and 100 microns,
e. wherein the weight ratio of epoxy resin to filler is between 2:1 and 1:5.

9. A filled resin comprising:
1. a cured epoxy resin,
2. a filler of particles of calcium-aluminum glass wherein the glass is free of silicon, boron, and alkali metals.

10. A filled resin comprising:
1. a cured epoxy resin,
2. a filler of particles of calcium-aluminum glass
a. wherein the glass is free of silicon, boron, and alkali metals,
b. wherein contains between 25 and 75% by weight $Al_2O_3$ and between 20 and 60% by weight CaO,
c. wherein the calcium aluminum glass contains up to 30 weight percent of an oxide selected from the group consisting of BaO, SrO, MgO, BeO, ZnO, $La_2O_3$, $Sb_2O_3$, $ZrO_2$, $P_2O_5$, $Fe_2O_3$, and $TiO_2$.

11. A filled resin consisting essentially of:
1. a cured epoxy resin comprising the reaction product of:
a. 1,1'-bis(3,4 epoxyhexahydrophenyl cyclohexane,
b. hexahydrophthalic acid anhydride,
2. a filler of particles of calcium-aluminum glass,
a. wherein the glass is free of $SiO_2$, $B_2O_3$, and alkali oxides,
b. wherein contains between 35 and 60% by weight $Al_2O_3$ and between 20 and 50% by weight CaO,
c. wherein the calcium aluminum glass contains 2 to 20 weight percent of an oxide selected from the group consisting of BaO, SrO, MgO, BeO, ZnO, $La_2O_3$, $Sb_2O_3$, $ZrO_2$, $P_2O_5$, $Fe_2O_3$, and $TiO_2$,
d. wherein the particles are spherical in form and have a variety of sizes between 1 and 100 microns,
e. wherein the weight ratio of epoxy resin to filler is between 2:1 and 1:5.

12. An encased high-voltage switch gear having high voltage carrying metal switching members, a grounded metal sheathing surrounding said switching members and forming a sealed enclosure filled with insulating gas, insulating supports for securing said switching members within said sheathing wherein the material of said insulating support is a filled resin electrical insulator within the container in contact with the gas, said filled resin comprising:
A. a cured epoxy resin,
B. a filler of particles of calcium-aluminum glass wherein the glass is free of silicon, boron, and alkali metals.

* * * * *